UNITED STATES PATENT OFFICE.

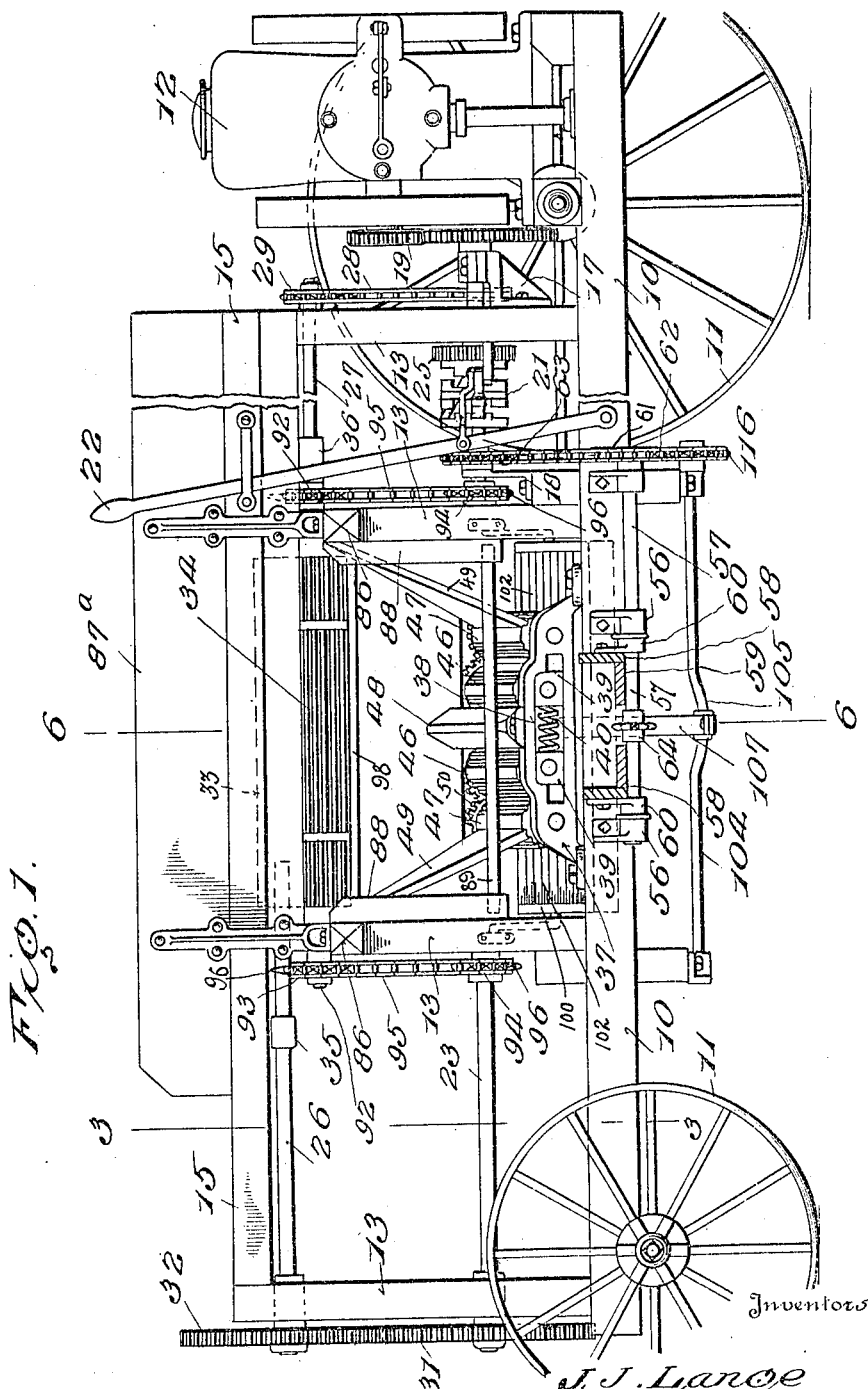

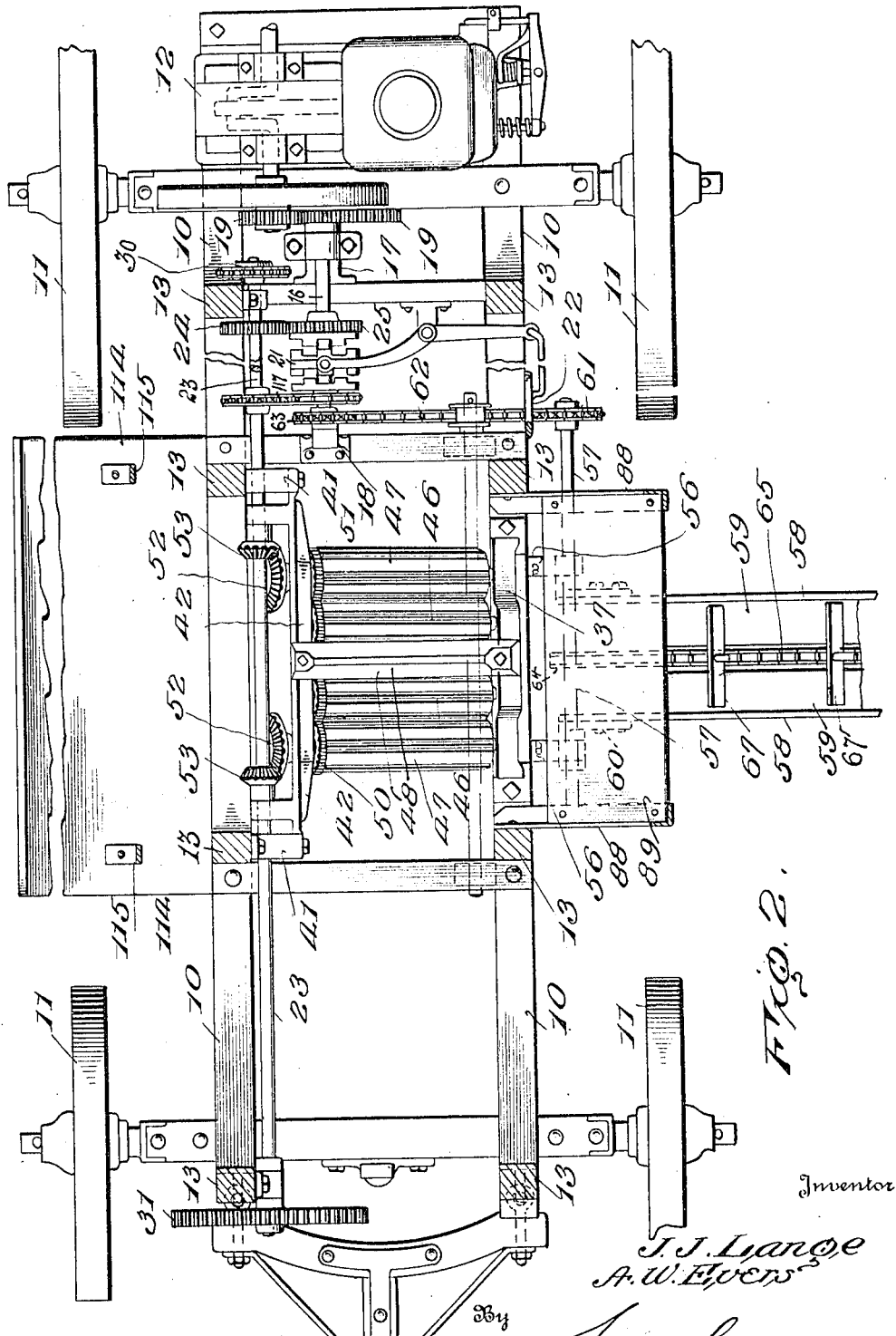

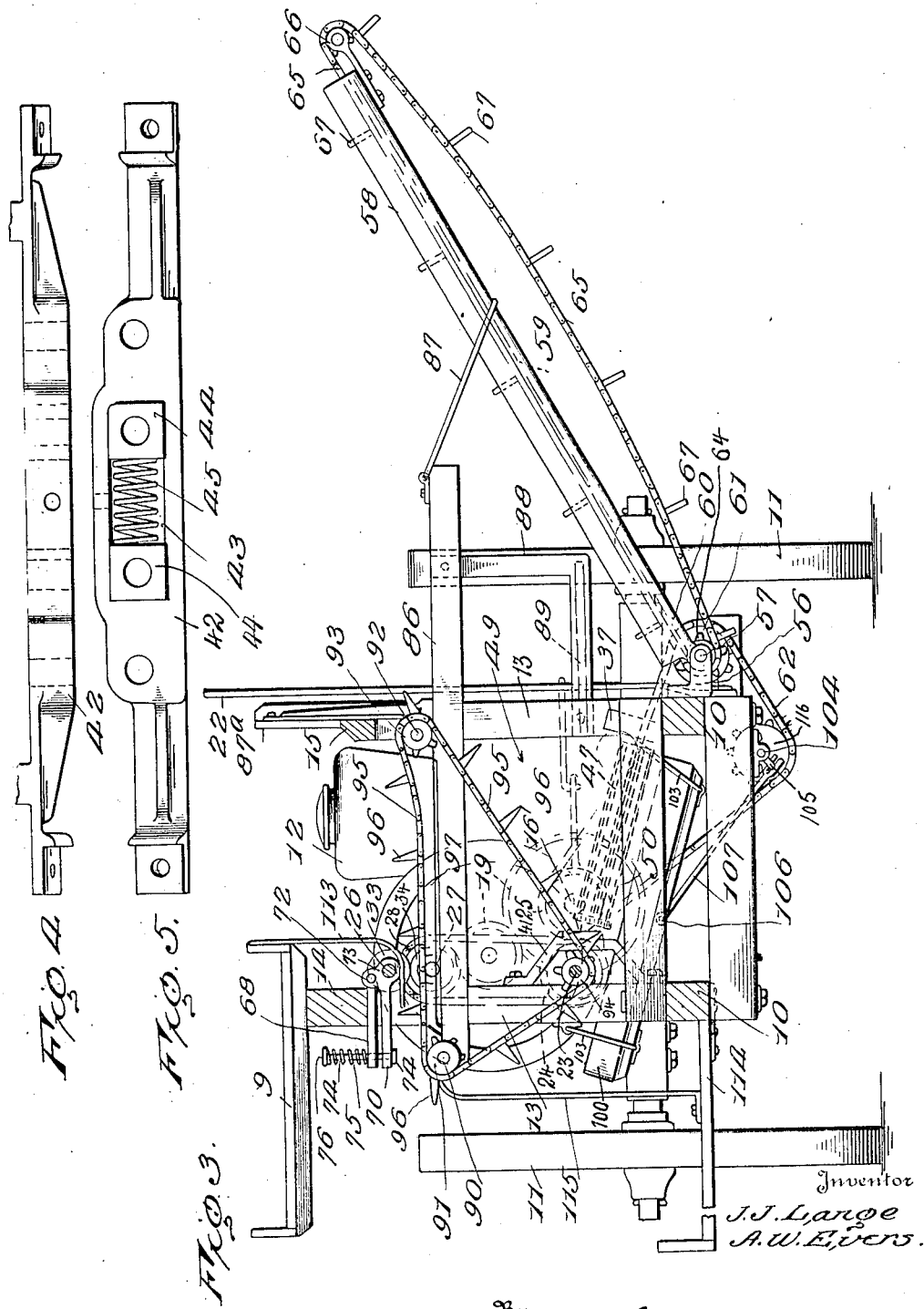

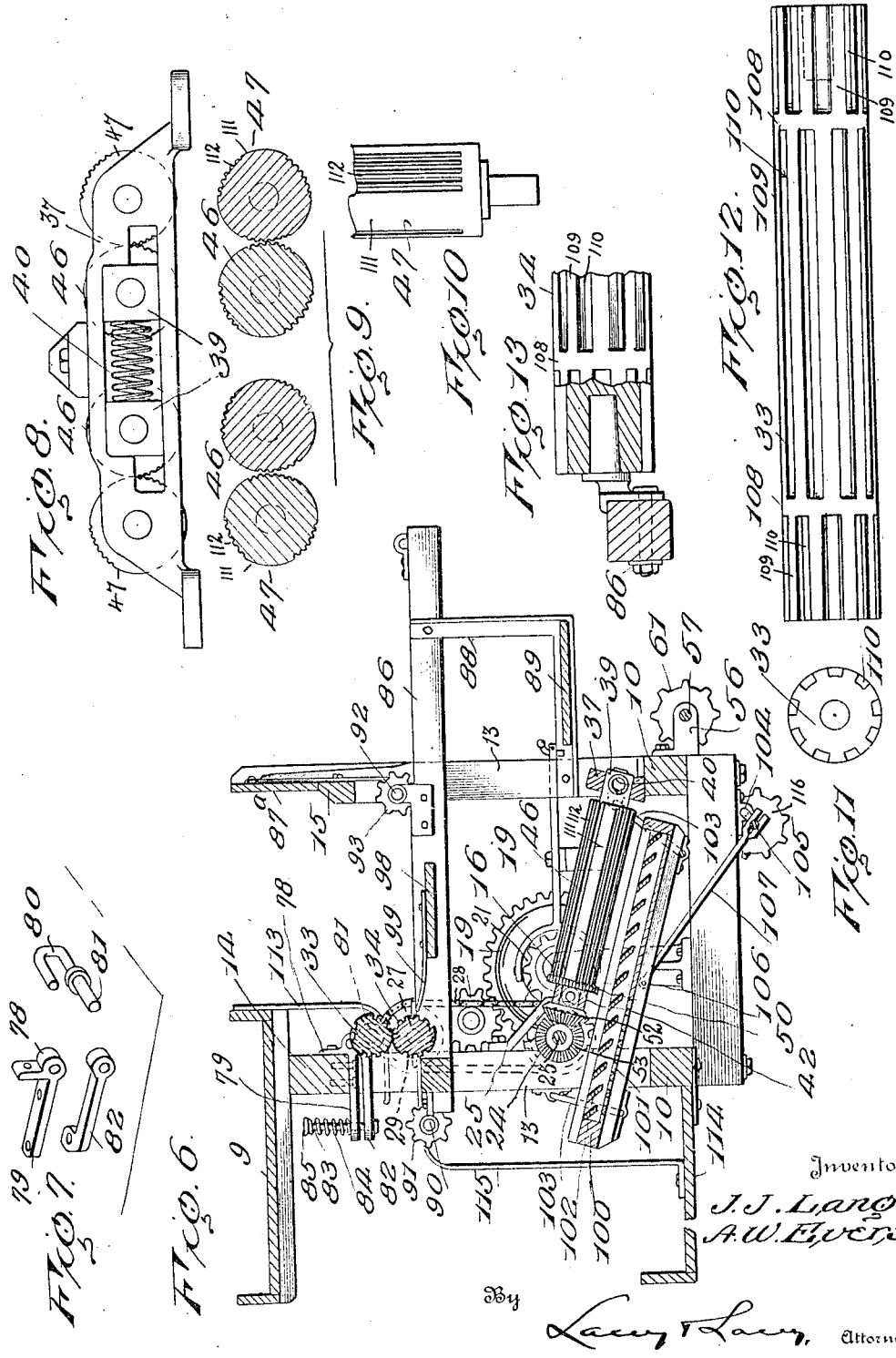

JOSEPH J. LANGE, OF CELINA, AND ANDREW W. EVERS, OF ST. HENRY, OHIO.

COMBINED CORN SNAPPER, HUSKER, AND SIFTER.

1,291,938.  Specification of Letters Patent.  Patented Jan. 21, 1919.

Application filed March 19, 1918. Serial No. 223,404.

*To all whom it may concern:*

Be it known that we, JOSEPH J. LANGE and ANDREW W. EVERS, citizens of the United States, residing at Celina and St. Henry, respectively, in the county of Mercer and State of Ohio, have invented certain new and useful Improvements in Combined Corn Snappers, Huskers, and Sifters, of which the following is a specification.

This invention relates to improvements in combined corn snapping and husking machines, and has for one of its objects to improve the construction and increase the efficiency and utility of devices of this character.

Another object of the invention is to provide a device of this character whereby the ears of corn are removed or "snapped" from the stalks, the earless stalks removed at one side of the machine, the husks removed from the ears, and the kernels of corn which may be shelled during the husking operation recovered.

With these and other objects in view, the invention consists in certain novel features of construction, as hereinafter shown and described and then specifically pointed out in the claims.

The improved apparatus is preferably mounted upon a truck or wagon frame to enable it to be moved from place to place, and likewise preferably arranged to be actuated by a suitable motor mounted upon the truck frame.

In the drawings illustrative of the preferred embodiment of the invention—

Figure 1 is a side elevation of the improved apparatus from the discharge side.

Fig. 2 is a plan view without the gathering or feed table, and with the snapping roller supports, and the guard fingers in transverse section.

Fig. 3 is an end elevation with the horizontal frame members and transmitting shafts in section on the line 3—3 of Fig. 1.

Fig. 4 is a plan view, enlarged, of the bearing for the upper ends of the husking rolls.

Fig. 5 is an elevation, enlarged, of the bearing shown in Fig. 4.

Fig. 6 is a transverse section on the line 6—6 of Fig. 1.

Fig. 7 represents perspective views of the supporting members for one end of the upper snapping roll.

Fig. 8 is a side view of the bearing for the lower ends of the husking rolls.

Fig. 9 represents end elevations of the husking rolls.

Fig. 10 is a plan view of a portion of one of the husking rolls.

Fig. 11 is an end view of one of the snapping rolls.

Fig. 12 is a side view of one of the snapping rolls.

Fig. 13 is a sectional detail illustrating the manner of supporting the lower snapping roll at one end.

The supporting truck comprises a frame, indicated as a whole at 10, and carrying bearing wheels 11. Mounted upon the truck frame is a suitable operating motor represented conventionally at 12.

Rising from the platform 10 at its ends and at intermediate points are standards 13 suitably braced from the platform.

Longitudinally directed supporting members 14—15 bear upon the standards 13 at the sides of the truck, the member 14 being utilized to support a feed table 9 upon which the corn stalks are deposited prior to the action of the snapping rolls.

Mounted for rotation upon the truck frame is a main driving shaft 16, being supported at one end by a bearing bracket 17 and at the other end by a standard 18. The shaft 16 is driven from the motor 12 by suitable gears 19. The shaft 16 is provided with a suitable clutch device 21 adapted to be actuated by a lever 22 convenient to the hand of the operator, to connect and disconnect the motor from certain of the operating devices as hereafter explained. Mounted for rotation upon certain of the standards 13 is another shaft 23 connected to be driven from the main shaft 16 by gears 24—25. Mounted for rotation on certain of the standards 13 is another shaft 26, and mounted for rotation upon certain of the standards 13 is another shaft 27, the shafts 26—27 being arranged in parallel relation near the upper portion of the apparatus. The shaft 27 is arranged to be positively rotated by a chain 28 and chain wheels 29—30 from the shaft 23, while the shaft 26 is arranged to be actuated from the shaft 23 by gears 31—32. The shafts 26—27 support the snapping rolls 33—34. The shaft 26 is provided with a sleeve coupling 35, while the shaft 27 is provided with a similar sleeve coupling 36, the couplings permitting the necessary vertical adjustment or yieldable movement of the snapping rolls, as hereafter explained.

Mounted upon one of the main longitudinal members of the truck frame is a relatively long bearing frame 37 having a relatively long slot in which are supported bearing blocks 39 in spaced relation and maintained yieldably in separated position by means of a spring 40. Supported by brackets 41 from a contiguous pair of the standards 13 at the side of the frame opposite the bearing 37, is another bearing member 42 having a longitudinally directed slot 43 in which are bearing blocks 44, yieldably separated by a spring 45. The journals of one of the inner husking rolls 46 are supported by the bearing blocks 39 and 44. The husking rolls 47 are mounted by their journals in the bearing apertures in the bracket devices 37 and 42, the rollers 46—47 at one side of the center coacting while the other pair of husking rolls correspondingly coact at the other side of the center.

A dividing rib 48 is supported upon the bearing devices 37 and 42, and operates to guide the ears of corn to the husking rolls. Gather boards 49 are arranged to coact with the dividing rib to guide the ears to the rolls. One pair of the husking rolls at one side of the center is provided with gears 50 to cause the rolls to be positively rotated toward each other, while the husking rolls at the opposite side of the center are provided with similar gears 51, to cause them to operate toward each other. The journals of the outer husking rolls 47 are extended and provided respectively with beveled gears 52 which engage with corresponding beveled gears 53 on the shaft 23. By this means it will be obvious that when the shaft 23 is rotated its motion will be transmitted to the husking rolls and operate the same.

Attached to the same frame member which carries the bracket 37 are smaller brackets 56 on which a shaft 57 is mounted for rotation. A suitable elevator device forms a part of the improved apparatus and comprises side members 58 and bottom members 59. The side members 58 are provided respectively with brackets 60 mounted for oscillation upon the shaft 57. By this means the elevator frame may be adjusted vertically, or caused to swing upon the shaft 57. The shaft 57 is extended at one end as shown in Fig. 2, and provided with a chain wheel 61 over which a chain 62 leads to a corresponding chain wheel 63 on the main shaft 16. By this means the motion of the shaft 16 is communicated to the shaft 57. The shaft 57 is provided with a chain pulley 64 over which a chain 65 leads to a similar chain pulley 66 at the outer end of the elevator frame. The chain 65 operates between the bottom members 59, and is armed with a plurality of carriers or blades 67 spaced at uniform distances, and operate to convey the husked ears to a suitable receptacle, not shown.

Connected to the longitudinally directed frame member 14 is a bar 68 having a bearing at one end extending in advance of the inner face of the member 14 and perforated at the other end externally of the outer face of the member 14. Another bar 70 is provided with a bearing pivotally coupled to the bearing of the member 68 by a pivot pin 72. The bar 70 is likewise provided with another larger bearing 73 in which the shaft 26 is mounted for rotation. The bar 70 is provided with a pin 74 which extends through an aperture in the outer end of the bar 68, and surrounding the pin externally of the bar 68 is a spring 75, the pin 74 having a head 76 at its upper end to bear upon the spring. By this means it will be obvious that the spring 75 operates to maintain the bars 68—71 in close relation, and yieldably support the upper snapping roll 33 at one end. The shaft 26 terminates a short distance within the upper snapping roll 33, and is rigidly secured to the snapping roll so that the latter rotates with the shaft.

Attached to the member 14 at the opposite end of the upper snapping roller is a bracket 78 having an extension 79 similar to the bar 68. The bracket 78 has a bearing through which a curved rod 80 is mounted for rotation near one end while the opposite end constitutes a journal to extend for a distance into the adjacent end of the snapping roller 33 as indicated at 81. Connected to the terminal of the portion of the member 80 which extends through the bracket 78 is an arm 82, similar to the arm 71. The arm 82 carries a pin 83 similar to the pin 74 and extending through an aperture in the arm 79. Surrounding the pin 83 is a spring 84 similar to the spring 75 and held in position upon the pin by a laterally directed head 85. By this means the spring 84 operates to yieldably support the adjacent end of the roller 33, while at the same time permitting the latter to be rotated by the shaft 26. The upper roller 33 is thus yieldably held against normal pressure but will yield to abnormal pressure, the sleeve coupling 35 permitting the limited vertical movement without interfering with the operation of the shaft 26.

The feed table 9 is suitably supported upon the member 14 and is formed with vertical side members at the edges to retain the stalks when deposited thereon. Supported upon certain of the vertical members 13 are bearing rails 86, the latter extending in advance of the members 13 at the feed side of the device as shown in Fig. 3. The elevator portion of the device is maintained in proper inclined position by a bail device represented at 87, the ends of the bail device being supported by the members 86 as shown. Rising from the member 15 is a guard board 87ª to protect the operator while feeding the stalks to the snapping rolls. Connected to the rails 86 and to the adjacent members 13 are hanger devices 88 arranged to support a suitable standing board 89 for the operator while feeding the stalks to the snapping rolls.

Mounted upon the rails 86 at the end opposite to the stand 89 are stub shafts 90 each carrying a chain pinion 91 and near the longitudinal frame member 15 are other stub shafts 92 carrying chain pinions 93. The shaft 23 is provided with chain pinions 94 in vertical alinement with the pinions 91 and 93, the sets of pinions receiving endless chains 95 having carrier fingers 96. The chains 95 are thus rotated from the shaft 23, and are so arranged that they operate to cause the fingers 96 to feed the stalks to the snapping rolls. Attached to each rail 86 are guard devices 97 to support and guard the chains in their passage between the stub shafts 90 and 92. The stub shaft 92 is located slightly above the line of the stub shaft 90 so that the chains 95 curve downwardly as they leave the pinions 93 as shown in Fig. 3, and thus facilitate the feeding of the stalks to the snapping rolls. Extending between the rails 86 is a guard or support 98 attached to which is a yieldable supporting finger 99, the latter operating to support the intermediate portion of the stalks as they are carried toward the snapping rolls by the chains and preventing them from sagging downwardly toward the husking rolls.

It will be noted that the corn stalks are fed to the snapping rollers sidewise or lengthwise of the snapping rollers, with the root ends and the tassel ends extending beyond the ends of the rollers and beneath the shaft 26 at one side and above the shaft 27 at the opposite side. The passage of the stalks is thus free and uninterrupted.

The husks of the corn must be relatively dry to enable the husks to be readily removed and this condition presupposes that the kernels of corn must be correspondingly dry. During the husking operation many of the kernels are necessarily torn loose from the cob by the action of the husking rollers and pass between the rollers with the detached husks. The present apparatus includes means to recover these prematurely shelled kernels comprising a screen consisting of a supporting frame 100, a bottom 101 perforated at its highest end and imperforate in its lower portion, and a plurality of obliquely disposed slats 102. The frame 100 is suspended for vibration beneath the husking rolls by bail devices 103. Supported beneath the truck frame 10 is a shaft 104 having an intermediate crank or band 105. Pivoted at 106 to the frame 100 is a connecting rod 107, the latter coupled at one end to the crank 105. By this arrangement it will be obvious that the rotary motion of the shaft 104 will be communicated to the screen device, and the latter caused to be rapidly vibrated to cause any loose kernels of corn which may be shelled from the ears during the husking operation to be separated from the husks and deposited in a suitable receptacle at the lower end of the screen, while the husks pass over the foot end of the screen.

Attached to one end of the shaft 104 is a chain wheel 116 in alinement with the chain wheels 61 and 63, and the chain 62 is extended to engage the three chain wheels. By this means the chain 62 is utilized to operate the shaft 57 of the elevator device and the shaft 104 of the screen device.

The snapping rolls 33—34 are constructed as shown in Figs. 11 and 12. Each snapping roll is formed with annular blank spaces 108 intermediate the ends and the remaining portions of the surface formed with alternating ribs 109 and hollow spaces 110, with the ribs at the ends of the roll externally of the blank spaces opposite the spaces 110 of the intermediate portions of the roll as shown more clearly in Fig. 12.

The construction of the husking rolls is illustrated in Figs. 9 and 10. The surface of each of the husking rolls is formed into alternating blank spaces 111 and ribs or corrugations 112 as shown more clearly in Fig. 9, which represents transverse sections of the husking rolls.

Combined guard and guide fingers 113 are connected to the receiving platform 9 and curved toward the discharge side in relatively close proximity to the upper snapping roll 33, to guide the stalks to the snapping rolls.

Supported from the frame 10 at the discharge side is a platform 114 to receive the stalks as they are discharged from the snapping rolls. Connected to the rails 86, or other suitable portion of the device, are combined braces and guards 115 which operate to not only support the platform 114, but also to guard the mechanism, especially the screen device, from the denuded stalks that have had the ears snapped from them.

The clutch device 21 is double-sided or arranged to operate in both directions. The shafts 16 and 23 are connected by a chain 117 operating over chain wheels on the shafts. When the clutch device is coupled to the side next to the gears 24—25, the shaft 23 will be run in one direction, and when the clutch device is coupled to the side next to the chain 117 the motion will be reversed. This may be required under certain conditions.

The clutch device also enables the elevator operating mechanism and the screen operating mechanism to be cut out when required.

Having thus described the invention, what is claimed as new is:

1. In a machine of the class described, a supporting frame, coacting snapping rolls disposed longitudinally on the frame at one side thereof, coacting husking rolls disposed transversely on the frame below the line of the snapping rolls, transverse movable carrier devices on the frame at the sides of the husking rolls and laterally beyond and extending past the terminals of the snapping rolls, and a plurality of fingers secured at their upper ends to the frame above and in advance of the snapping rolls, said fingers depending to the snapping rolls and having their lower ends turned toward the bight between said rolls.

2. In a machine of the class described, a supporting frame, coacting snapping rolls disposed longitudinally on the frame, coacting husking rolls disposed transversely on the frame below the line of the snapping rolls, transverse movable carriers on the frame above the husking rolls and at the sides thereof and laterally beyond the terminals of the snapping rolls, and a transverse resilient finger on the frame between the carrier devices in advance of the snapping rolls and having its free end extending upwardly to the bight of the snapping rolls.

3. In a machine of the class described, a supporting frame, coacting snapping rolls mounted longitudinally on the frame at the rear side of the same, carriers operating transversely of the frame to feed stalks to the snapping rolls, a receiving table secured longitudinally on the rear side of the frame over the snapping rolls, a vertical guard secured to and extending longitudinally of the supporting frame at the front side thereof, and a platform secured on the front side of the frame below said guard.

4. In a machine of the class described, coacting snapping rolls having end and intermediate series of longitudinal grooves, the series of grooves being separated by annular smooth surfaces and the grooves in each series being separated by longitudinal smooth surfaces, the grooves in the central series being in alinement with the spaces between the grooves in the end series and the annular and longitudinal smooth surfaces being flush and above the grooves.

5. In a machine of the class described, a supporting frame, bracket devices connected to said frame in spaced relation, and each having a bearing at one end, coacting lever arms pivoted respectively to said bearings, and a snapping roll pivotally connected respectively to said lever arms.

In testimony whereof we affix our signatures.

JOSEPH J. LANGE. [L. S.]
ANDREW W. EVERS.

Copies of this patent may be obtained for five cents each, by addressing the "Commissioner of Patents, Washington, D. C."